(12) United States Patent
Park et al.

(10) Patent No.: US 7,606,228 B2
(45) Date of Patent: Oct. 20, 2009

(54) HOME GATEWAY SYSTEM FOR PROVIDING OPTICAL COMMUNICATION PACKET DATA INTERFACE FUNCTION AND HOME BROADCAST SERVICE PROVIDING METHOD USING THE SAME

(75) Inventors: Wan Ki Park, Taejon (KR); Chang Sic Choi, Taejon (KR); Youn Kwae Jeong, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 661 days.

(21) Appl. No.: 11/023,673

(22) Filed: Dec. 29, 2004

(65) Prior Publication Data

US 2006/0083253 A1   Apr. 20, 2006

(30) Foreign Application Priority Data

Oct. 15, 2004   (KR) .................. 10-2004-0082832

(51) Int. Cl.
*H04L 12/28* (2006.01)
*H04J 3/16* (2006.01)

(52) U.S. Cl. .................. 370/390; 370/432; 370/466

(58) Field of Classification Search .......... 370/360, 370/389, 390, 392, 396, 486, 395.3, 395.53, 370/466, 471, 474, 480, 432, 461; 709/238; 398/72, 98; 379/69, 79, 219
See application file for complete search history.

(56) References Cited

U.S. PATENT DOCUMENTS

| 5,864,415 | A  | * | 1/1999 | Williams et al. ............ 398/72 |
| 6,366,712 | B1 | * | 4/2002 | Buabbud et al. ............ 385/15 |
| 6,873,627 | B1 | * | 3/2005 | Miller et al. ............... 370/466 |
| 6,898,276 | B1 | * | 5/2005 | Millet et al. ............... 379/219 |
| 6,937,608 | B1 | * | 8/2005 | Deng ......................... 370/432 |
| 2002/0001310 | A1 | * | 1/2002 | Mai et al. ................. 370/390 |
| 2002/0063924 | A1 | * | 5/2002 | Kimbrough et al. ........ 359/125 |
| 2004/0073612 | A1 | * | 4/2004 | Kim et al. ................. 709/205 |
| 2004/0184806 | A1 | * | 9/2004 | Lee et al. .................. 398/79 |

(Continued)

FOREIGN PATENT DOCUMENTS

KR   1020020092576   12/2002

(Continued)

OTHER PUBLICATIONS

(IGMP snooping: a VLAN-based multicast protocol, Jun Wang; Limin Sun; Xiu Jiang; ZhiMei Wu, High Speed Networks and Multimedia Communications 5th IEEE International Conference on Jul. 3-5, 2002 pp. 335-340,).*

*Primary Examiner*—Aung S Moe
*Assistant Examiner*—Awet Haile
(74) *Attorney, Agent, or Firm*—Lowe Hauptman Ham & Berner, LLP (57) ABSTRACT

There are provided a home gateway system providing an optical communication packet data interface function and a home broadcast service providing method using the same. The home gateway system is constructed to include a network processor having two Ethernet interfaces connected to a system control processor of a home gateway and an Ethernet switch having an Ethernet multicast traffic processing/IGMP snooping function based on an Ethernet L2 multicast MAC table to thereby simultaneously provide a broadcast service such as a CATV broadcast service, and an Internet data service to a plurality of hosts in a home. In case of a broadcast service, the home gateway system converts a broadcast stream into an IP multicast packet and then processes the broadcast IP multicast packet by an L2 multicast function of an Ethernet switch, thereby making it possible to directly transmit the broadcast IP multicast packet to a host without the help of the control processor.

2 Claims, 7 Drawing Sheets

U.S. PATENT DOCUMENTS

| | | | |
|---|---|---|---|
| 2004/0240466 A1* | 12/2004 | Unitt et al. | 370/461 |
| 2005/0047790 A1* | 3/2005 | Joo et al. | 398/98 |
| 2005/0053376 A1* | 3/2005 | Joo et al. | 398/72 |
| 2005/0190781 A1* | 9/2005 | Green et al. | 370/432 |
| 2005/0243856 A1* | 11/2005 | Mishra et al. | 370/447 |
| 2005/0265386 A1* | 12/2005 | Smith et al. | 370/466 |
| 2006/0013244 A1* | 1/2006 | Yamamoto | 370/432 |
| 2006/0127091 A1* | 6/2006 | Yoo et al. | 398/69 |
| 2006/0235993 A1* | 10/2006 | Gervais et al. | 709/238 |

FOREIGN PATENT DOCUMENTS

| | | |
|---|---|---|
| KR | 1020030072482 | 9/2003 |
| WO | WO 01/05158 | 1/2001 |

* cited by examiner

| CHANNEL NUMBER | L2 MULTICAST MAC ADDRESS (DMAC, SMAC) | L3 MULTICAST IP ADDRESS (DA, SA) |
|---|---|---|
| CHANNEL 'A' | Set A | Set A' |
| CHANNEL 'B' | Set B | Set B' |
| CHANNEL 'C' | Set C | Set C' |
| . . . . . . . . | . . . . . . . . | . . . . . . . . |
| . . . . . . . . | . . . . . . . . | . . . . . . . . |

HOME GATEWAY SYSTEM FOR PROVIDING OPTICAL COMMUNICATION PACKET DATA INTERFACE FUNCTION AND HOME BROADCAST SERVICE PROVIDING METHOD USING THE SAME

BACKGROUND OF THE INVENITON

1. Field of the Invention

The present invention relates to a home gateway system and home broadcast service providing method using the same, and more particularly, to a home gateway system and home broadcast service providing method using the same, which provides an optical communication packet data interface function for simultaneously providing a broadcast service such as a cable television (CATV) broadcast service and an Internet data service to a plurality of hosts in a home.

2. Description of the Related Art

The conventional home network is constructed to include a broadcast network and an Internet Protocol (IP) data service network that are separated from each other.

That is, in case of the conventional home network, a broadcast is provided in such a way that broadcast service signals are inputted through a coaxial cable to a home and the inputted signals are transmitted to a set-top box and then transmitted to a digital TV through channel selection, demodulation and decoding by a tuner, while an IP data service is provided in such a way that IP data service signals are inputted to the home through a network separated from a broadcast service network and then transmitted to hosts such as a personal computer (PC).

SUMMARY OF THE INVENTION

Accordingly, the present invention is contrived to solve the problems of the prior art.

It is, therefore, an object of the present invention to provide a home gateway system providing an optical communication packet data interface function and a home broadcast service providing method using the same, which is constructed to include a network processor having two Ethernet interfaces connected to a system control processor of a home gateway and an Ethernet switch having an Ethernet multicast traffic processing/IGMP snooping function based on an Ethernet L2 multicast MAC table to thereby simultaneously provide a broadcast service such as a CATV broadcast service and an Internet data service to a plurality of hosts in a home through management of membership, conversion of a broadcast stream into an IP multicast packet and processing of a broadcast packet.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a home gateway system providing an optical communication packet data interface function. The system includes: an optical coupler for dividing an optical signal received from an access network into an IP network's packet data signal and a broadcast network's broadcast stream signal; an ONU module for packetizing the IP network's packet data signal; a broadcast packet/IP muticast packet module for converting the broadcast network's broadcast stream signal into an IP multicast packet; an Ethernet switch for processing the IP network's IP multicast packet and the IP multicast packet into which the broadcast stream is converted according to a L2 multicast MAC table to then transmit the processed packets to a destination port, and transmitting an unicast packet from the IP network to a control processor; and the control processor for controlling and managing the unicast packet and the L2 multicast MAC table.

In another aspect of the present invention, there is provided a home broadcast service providing method by using a home gateway system providing an optical communication packet data interface function. The method includes the steps of: dividing an optical signal received from an access network into an IP network's packet data signal and a broadcast network's broadcast stream signal; transmitting the IP network' packet data signal to an ONU module and packetizing the IP network' packet data signal, and then transmitting the packetized IP network' packet data signal to an Ethernet switch through an IP WAN port of a home gateway; transmitting the broadcast network's broadcast stream signal to a broadcast packet/IP muticast packet module, converting the broadcast network's broadcast stream signal into an IP multicast packet, and then transmitting the resulting IP multicast packet to the Ethernet switch; processing the IP network's IP multicast packet and the IP multicast packet into which the broadcast stream signal is converted according to a L2 multicast MAC table to then transmit the processed packets to a destination port, and transmitting an unicast packet received from the IP network to a control processor through a CPU port of the Ethernet switch; and performing required functions of a control processor, including a NAT/PAT function with respect to the unicast packet received from the Ethernet switch, and then retransmitting the resulting packet to the Ethernet switch to then transmit the retransmitted packet to a destination port.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
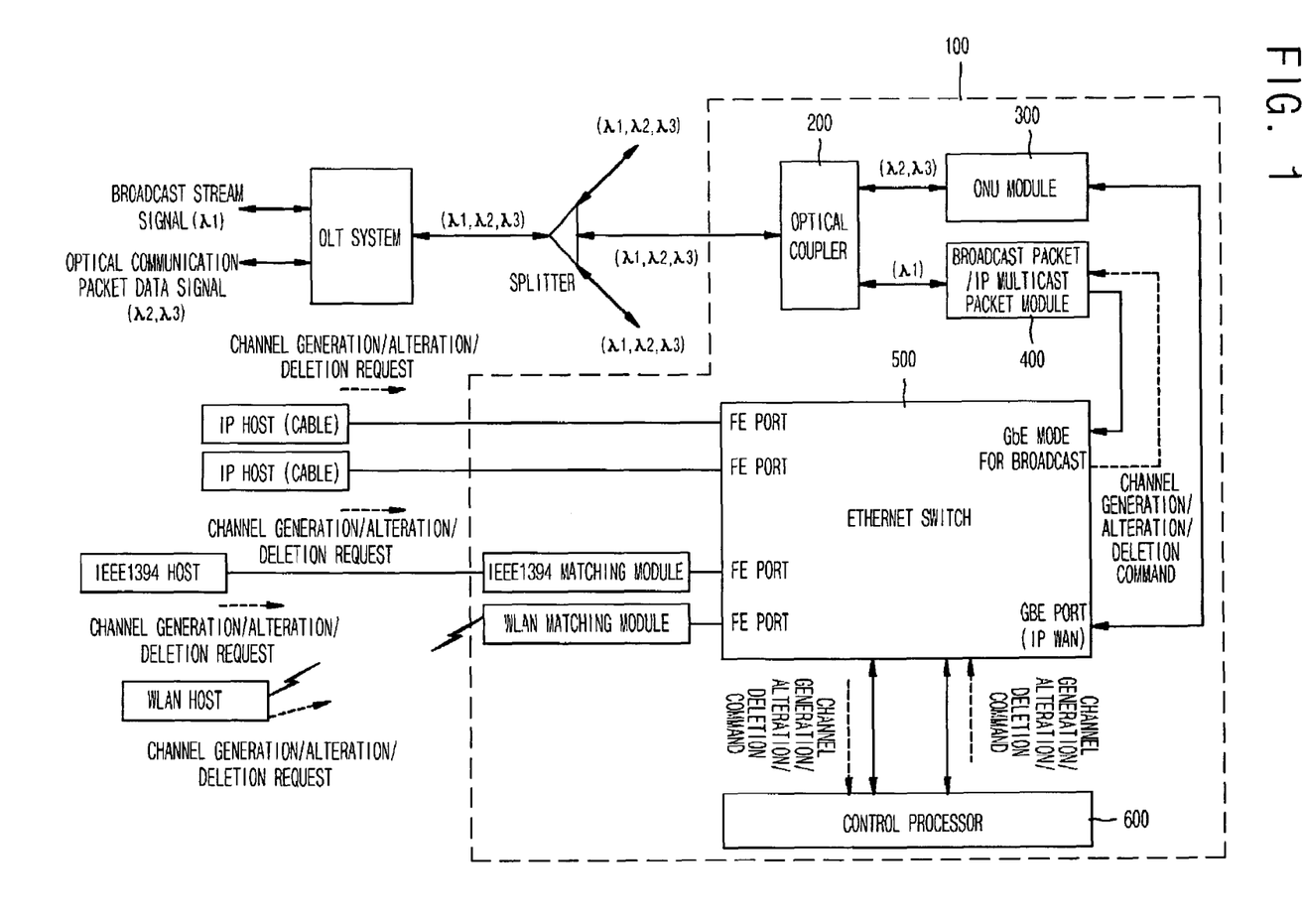
FIG. 1 is a block diagram of a home gateway system according to an embodiment of the present invention.

FIG. 1 is a block diagram of a home gateway system according to an embodiment of the present invention.

Referring to FIG. 1, a home gateway system 100 providing an optical communication packet data interface function includes an optical coupler 200, an optical network unit (ONU) module 300, a broadcast packet/IP multicast packet module 400, an Ethernet switch 500 and a control processor 600.

First, when signals transmitted from an optical line termination (OLT) system are provided to a home gateway through a splitter, the optical coupler 200 divides inputted optical signals into IP network's packet data signals and broadcast network's stream signals.

The ONU module 300 packet-processes IP network's packet data signals at the signals divided by the optical coupler 200, and the broadcast packet/IP multicast packet module 400 converts the broadcast network's stream signal into an IP multicast packet. Preferably, the ONU module is an Ethernet passive optical network (EPON) ONU module for providing EPON interface function.

The Ethernet switch 500 processes the IP network's multicast packet and the IP multicast packet into which the broadcast network's stream signal is converted by the broadcast packet/IP multicast packet module 400, depending on a L2 multicast medium access control (MAC) table to then transmit the processed packets to a destination port.

At this time, a unicast packet received from the IP network is transmitted to the control processor 600 through a central processing unit (CPU) port of the Ethernet switch 500.

The control processor 600 performs required functions such as a network address translation/port address translation (NAT/PAT) function with respect to the unicast packet received from the Ethernet switch 500, and then retransmits the resulting packet to the Ethernet switch 500 to thereby enable the resulting packet to be transmitted to a destination port of the home.

Figure 2:
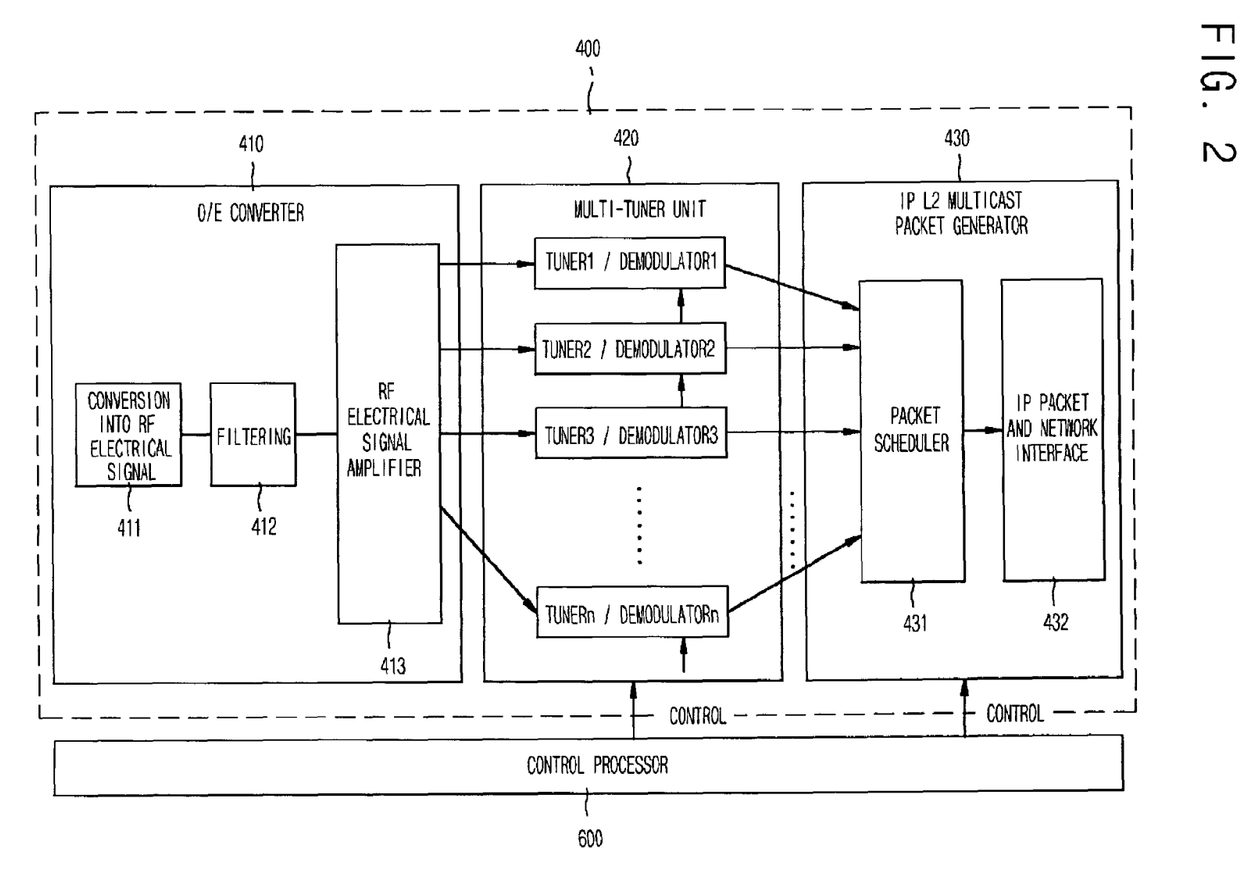
FIG. 2 is a block diagram of a broadcast packet/IP muticast packet generator according to an embodiment of the present invention.

FIG. 2 is a block diagram of the broadcast packet/IP muticast packet module 400 according to an embodiment of the present invention. The broadcast packet/IP muticast packet module 400 will now be described in detail with reference to FIG. 2.

Referring to FIG. 2, the broadcast packet/IP muticast packet module 400 includes an optical to electrical (O/E) converter 410 for converting an inputted optical signal into a radio-frequency (RF) signal, a multi-tuner unit 420 for selecting a broadcast channel required to be serviced from a broadcast stream signal received from the O/E converter 410 and then generating a digital broadcast stream, and an IP L2 multicast packet generator 430 for processing the generated digital broadcast stream and then converting the resulting stream into an IP multicast packet.

The O/E converter 410 converts (411) an inputted optical signal into an RF electrical signal, filters (412) the RF electrical signal, amplifies the filtered signal by an RF electrical signal amplifier 413 and then transmits the resulting broadcast stream signal to the multi-tuner unit 420.

The multi-tuner unit 420 is constructed to include N tuners and N demodulators according to home service requirements, and thereby converts an analog broadcast signal into a digital broadcast signal.

The IP L2 multicast packet generator 430 is constructed to include a packet scheduler 431 and an IP packet and network interface 432, to thereby sequentially process a broadcast stream inputted to a multi-structured buffer of the packet scheduler 431 according to a scheduling algorithm and then perform IP multicast packetization and interface with a 10/100 fast Ethernet interface by using the IP packet and network interface 432.

Figure 3:
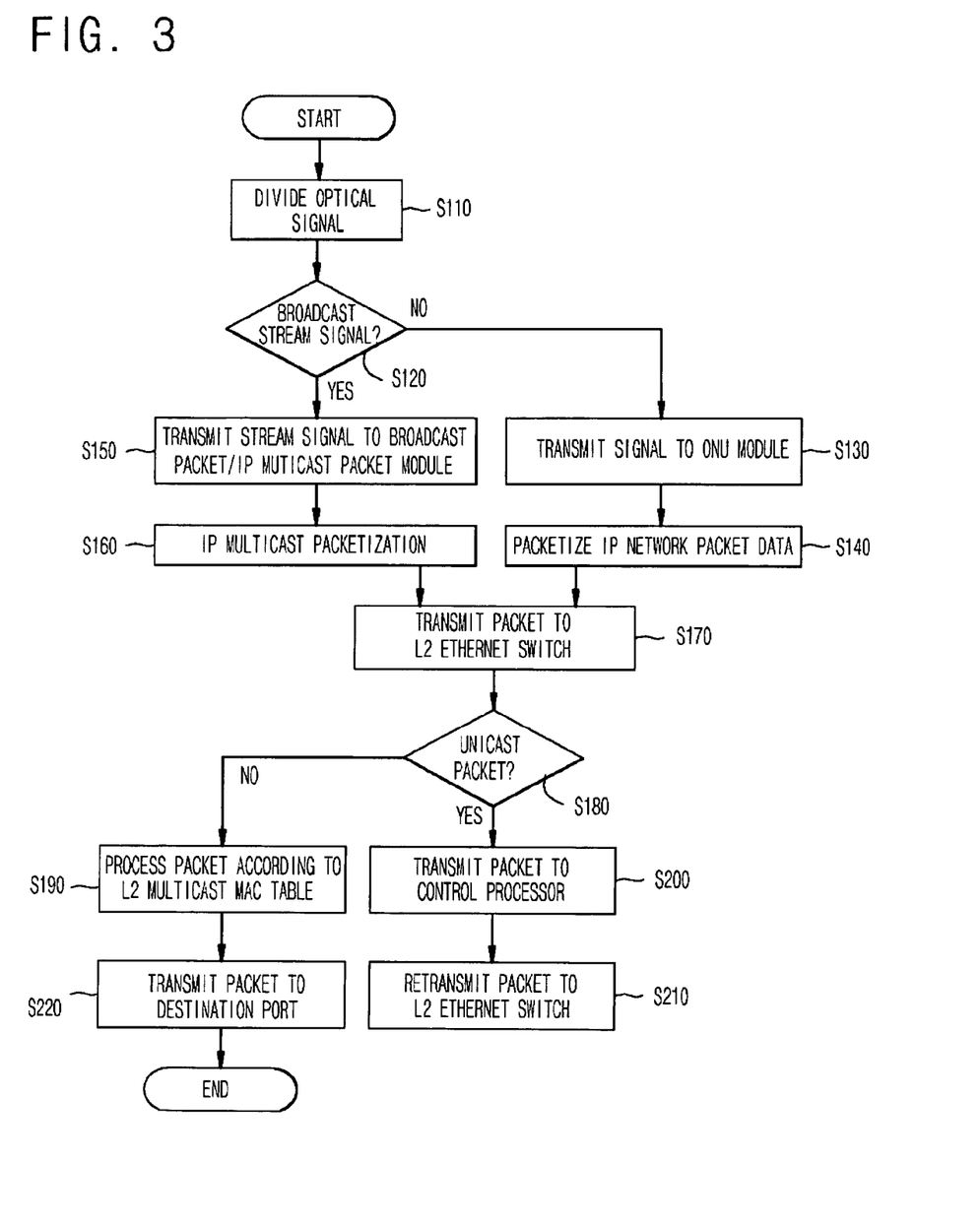
FIG. 3 is a flow diagram illustrating a broadcast service providing method using the home gateway system according to an embodiment of the present invention.

FIG. 3 is a flow diagram illustrating a broadcast service providing method using the home gateway system according to an embodiment of the present invention. The broadcast service providing method will now be described in detail with reference to FIGS. 1 through 3.

Referring to FIGS. 1 through 3, when an IP network's data packet and a broadcast network's stream are transmitted from an access network to a home by using optical signals of different wavelengths of λ1, λ2 and λ3, the received optical signals are divided into an IP network packet data signal and a broadcast stream signal by the optical coupler 200 (S110).

The resulting IP network packet data signal is transmitted to the ONU module 300 (S130) and packetized (S140), and then transmitted through an IP WAN (wide area network) port of a home gateway to the Ethernet switch 500 (S170).

Also, the resulting broadcast stream signal is transmitted to the broadcast packet/IP muticast packet module 400 (S150) to then be converted into an IP multicast packet (S160).

At this time, the broadcast packet/IP muticast packet module 400 converts a broadcast stream into an IP multicast packet by using the O/E converter 410, the multi-tuner unit 420 and the IP L2 multicast packet generator 430, wherein an optical signal inputted to the O/E converter 410 is converted into an RF electrical signal (411), the RF electrical signal is filtered (412), the filtered signal is amplified by the RF electrical signal amplifier 413, and then the amplified signal is transmitted to the multi-tuner unit 420.

The multi-tuner unit 420 is constructed to include N tuners and N demodulators according to home service requirements, to thereby select an active tuner out of the N tuners, select a required broadcast channel by using the selected active tuner and then convert the selected channel's signal into a digital broadcast stream by using a demodulator corresponding to the selected active tuner.

That is, the selected active tuner of the multi-tuner unit 420 extracts a required broadcast signal from an RF broadcast signal, wherein the extracted signal is an analog broadcast signal, for example an analog MPEG-2 TS (Motion Picture Experts Group-2 Transport Stream) signal.

The extracted analog broadcast signal is converted into a digital broadcast signal by a demodulator corresponding to the selected active tuner.

The resulting digital broadcast signal is inputted to the multi-structured buffer of the packet scheduler 431, and the inputted broadcast stream signal is sequentially processed according to a scheduling algorithm of the packet scheduler 431 to then be transmitted to the IP packet and network interface 432.

The IP packet generator 430 converts the inputted broadcast stream signal into an IP multicast packet by the IP packet and network interface 432. At this time, the IP packet generator 430 selects a corresponding address according to a channel identification value and a L2/L3 multicast address table, inserts the selected multicast address into the IP multicast packet, and then transmits the resulting IP multicast packet through the network interface to the Ethernet switch 500 (S170).

Here, the network interface 432 is a fast Ethernet interface or a gigabit interface.

Also, while a broadcast signal is transmitted through the aforementioned processes, a tuner manager and a scheduler manager and an IP/MAC address assigner (not shown) of the control processor 600 respectively control the multi-tuner unit 420 and the packet scheduler 431 and the IP L2 multicast packet generator 430. Actually, these control operations are performed by a control processor of a home gateway.

Figure 4:
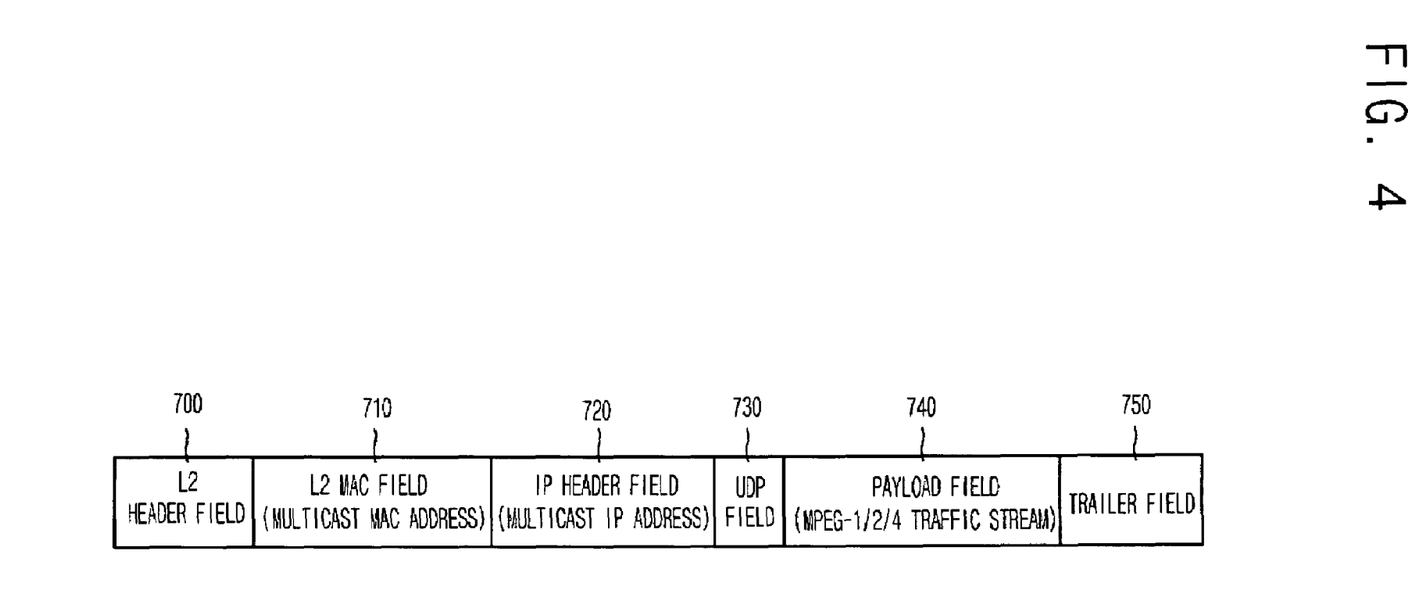
FIG. 4 is a diagram illustrating a structure of a broadcast packet converted into an IP multicast packet according to an embodiment of the present invention.

A broadcast L2 multicast packet transmitted to the L2 Ethernet switch 500 has a structure as shown in FIG. 4.

Referring to FIG. 4, the L2 multicast packet is constructed to include a L2 header field 700, a L2 MAC field 710 having a multicast MAC address, an IP header field 720 having a multicast IP address, a user defined protocol (UDP) field 730, a payload field 740 having an MPEG-1/2/4 traffic stream, and a trailer field 750.

Here, the payload field 740 may be a WMV type of Microsoft Corporation or a Quick Time type of Apple Corporation according as what traffic stream is used as a broadcast stream.

The Ethernet switch 500 transmits a unicast packet received from an IP WAN network through a media independent interface/gigabit media independent interface (MII/GMII) port used as an IP WAN port to the control processor 600 through a MII port used as a CPU port of the L2 Ethernet switch 500 (S200).

The control processor 600 then performs required functions such as a NAT/PAT function. Thereafter, if a corresponding packet should be transmitted to a host connected to a MII port of the L2 Ethernet switch 500, the control processor 600 retransmits the corresponding packet to the L2 Ethernet switch 500 through another MII interface of the control processor 600 and the L2 Ethernet switch 500 (S210), and then transmits the packet to a corresponding host through a physical element of a corresponding destination port (S220).

On the contrary, without being transmitted to the control processor 600 through a CPU port of the L2 Ethernet switch 500, an IP multicast packet received from an IP WAN is processed according to a L2 multicast MAC table of the L2 Ethernet switch 500 (S190), and then transmitted to a port to which a host, namely a member of a corresponding multicast group is connected (S220).

Also, a L2 multicast packet into which a broadcast stream received from a broadcast WAN port of the L2 Ethernet switch 500 is converted, is transmitted to a L2 Ethernet switch 500's port to which a host having requested a broadcast service is connected, depending on a L2 multicast MAC in the same manner as an IP multicast packet from an IP WAN port.

At this time, if the multicast packet having been transmitted to the destination port is transmitted to a host having a software CODEC (coder and decoder) function, such as a PC, the multicast packet is decoded by the software CODEC function for provision of a broadcast service. Otherwise, if the multicast packet having been transmitted to the destination port is transmitted to a host not having a software CODEC function, a broadcast service is provided by an IP set-top function.

In this manner, if the IP multicast packet and the multicast packet for a broadcast service is processed by a L2 multicast function of the L2 Ethernet switch 500, a load of the control processor 600 can be minimized and a broadcast service and an IP data service can be simultaneously provided.

Also, in order that the L2 Ethernet switch 500 performs a L2 multicast function, a corresponding L2 switch should provide an Internet group management protocol (IGMP) snooping function and a virtual local area network (VLAN) function, and the control processor 600 should manage a L2 multicast MAC table that is a basic table enabling a L2 multicast.

By using the IGMP snooping function, which exchanges messages such as 'IGMP QUERY', 'IGMP REPORT' and 'IGMP LEAVE' between a multicast router and a multicast host and performs snooping of the messages, that is transmission of the messages to the control processor 600, the control processor 600 manages a multicast MAC table of the L2 Ethernet switch 500.

In this manner, transmission of a corresponding packet to a port other than a multicast group of the L2 Ethernet switch 500 can be prevented.

Figure 5:
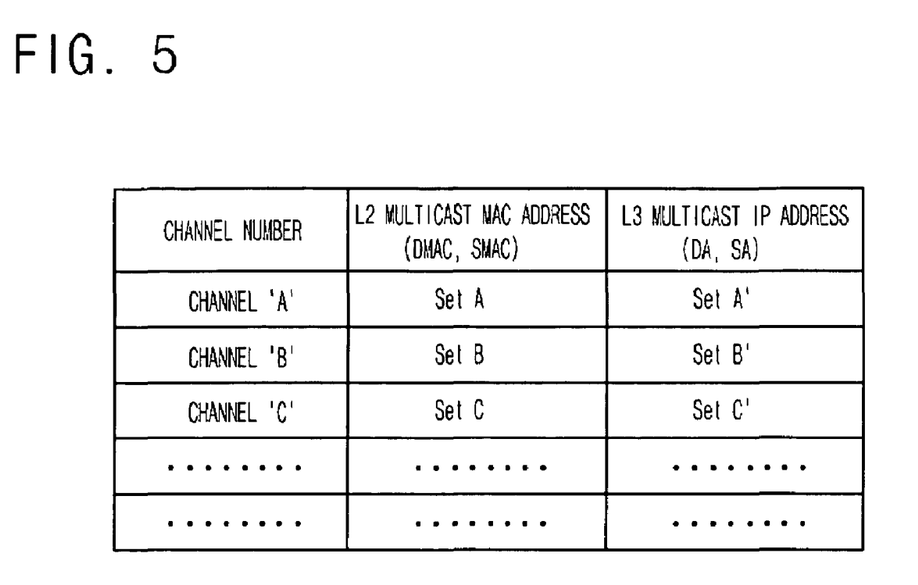
FIG. 5 is an exemplary diagram illustrating a channel-to-multicast address map according to an embodiment of the present invention.

For reference, FIG. 5 illustrates a channel-to-multicast address map according to an embodiment of the present invention.

Figure 6:
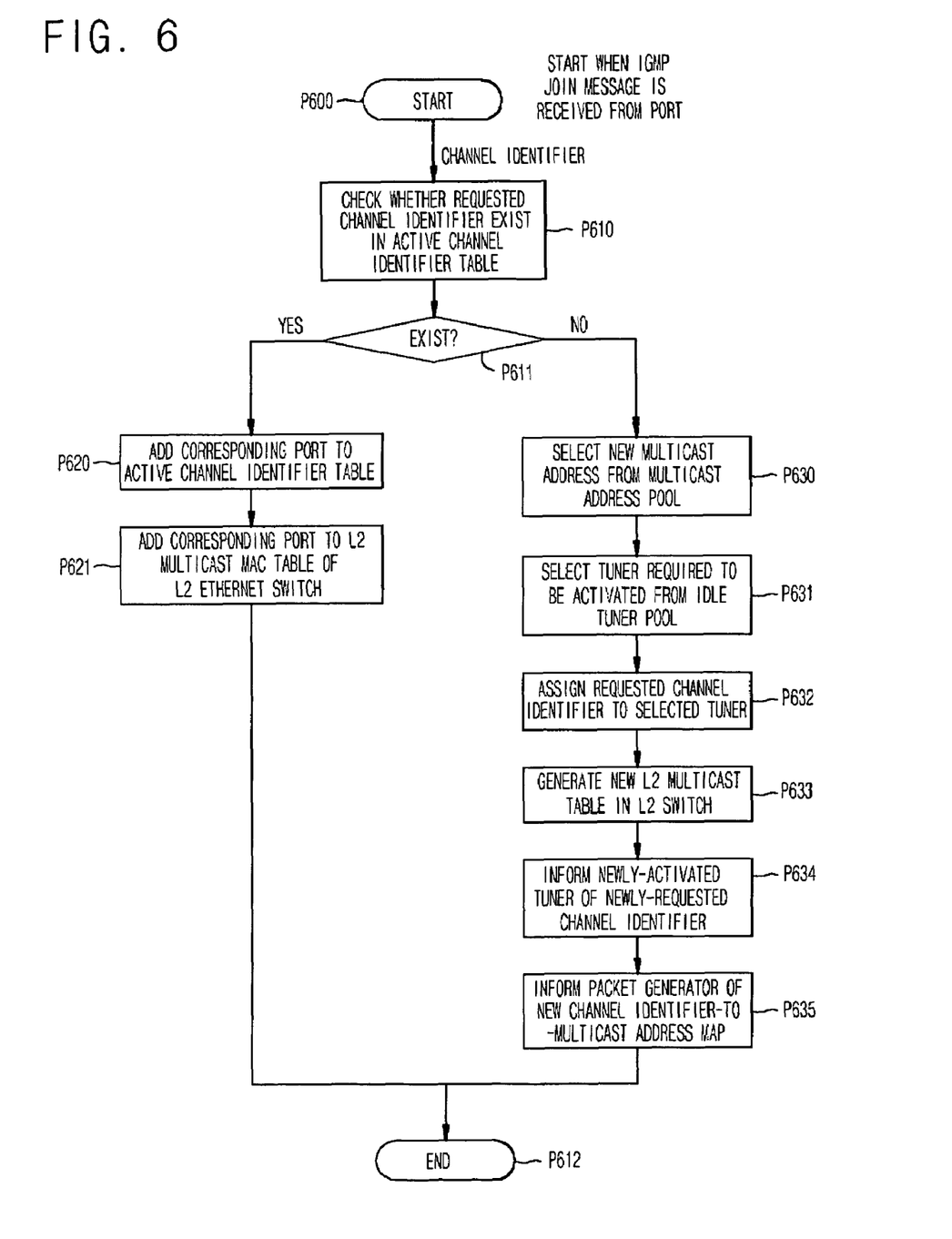
FIG. 6 is a flow diagram illustrating a channel generating procedure according to an embodiment of the present invention.
Figure 7:
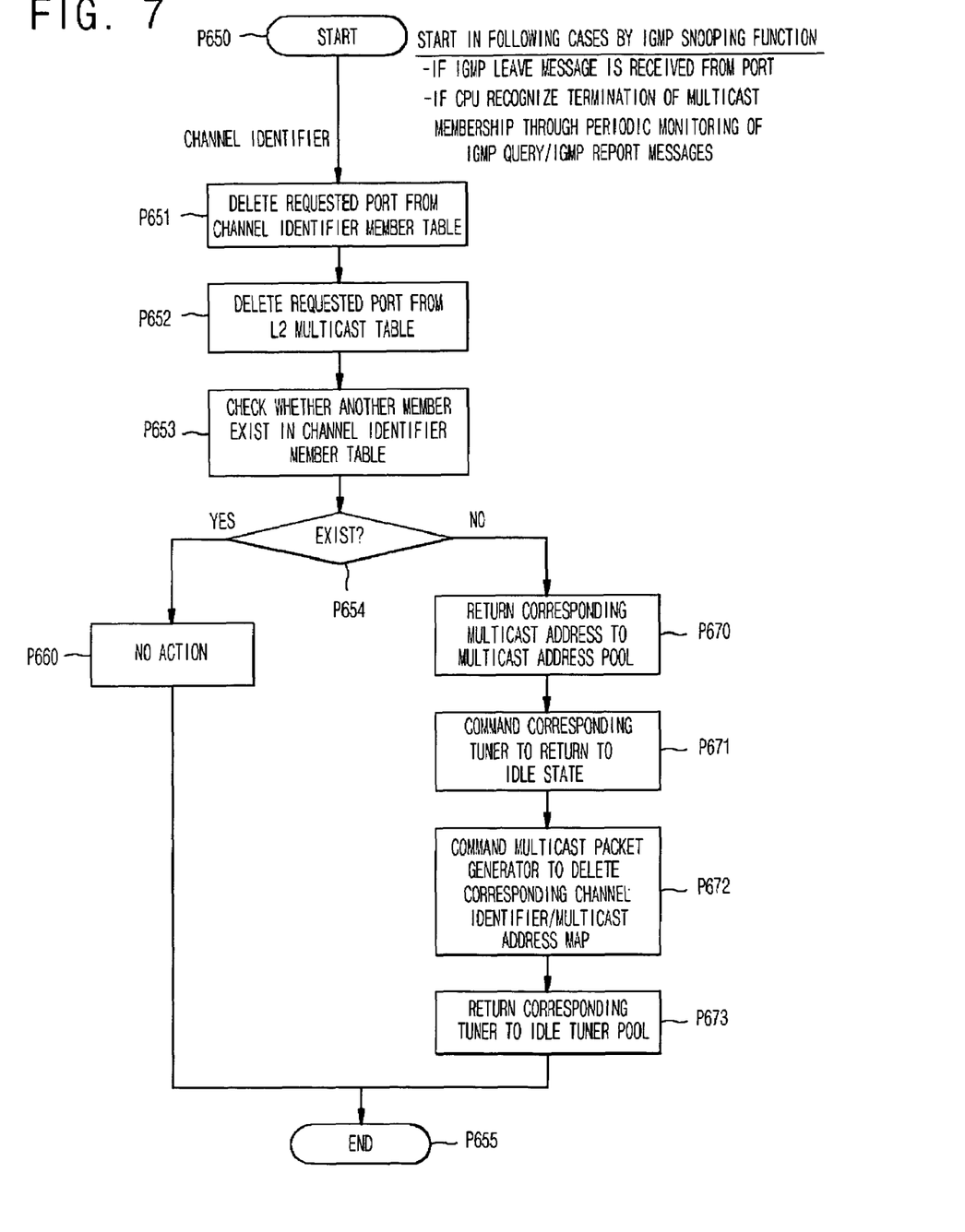
FIG. 7 is a flow diagram illustrating a channel deleting procedure according to an embodiment of the present invention.

For provision of a broadcast service, management of channel generation and deletion with respect to respective hosts should be performed in managing the multicast MAC table. The management of channel generation and deletion is performed by procedures shown in FIGS. 6 and 7. FIG. 6 illustrates a channel generating procedure according to an embodiment of the present invention, and FIG. 7 illustrates a channel deleting procedure according to an embodiment of the present invention. The channel generating and deleting procedures will now be described in detail with reference to FIGS. 6 and 7.

Referring to FIG. 6, the channel generating procedure starts when an IGMP JOIN message (performed by IGMP REPORT message) is transmitted from a random port of a L2 Ethernet switch to a control processor by an IGMP snooping function (the first step, P600). The channel generating procedure is then constructed to include the second step of the control processor's checking whether a requested channel identifier obtained from the IGMP JOIN message exists in an active channel identifier table (P610), the third step of judging the result of the third step (P611), the fourth step of adding a corresponding port to the active channel identifier table if the requested channel identifier exists in the active channel identifier table (P620), the fifth step of adding the corresponding port to a L2 multicast MAC table of a L2 switch (P621), the sixth step of selecting a new multicast address from a multicast address pool if the requested channel identifier does not exist in the active channel identifier table at the third step (P630), the seventh step of selecting a tuner required to be activated from an IDLE tuner pool (P631), the eighth step of assigning the requested channel identifier to the selected tuner (P632), the ninth step of generating a new L2 multicast table in the L2 switch (P633), the tenth step of informing a newly-activated tuner of a newly-requested channel identifier (P634), the eleventh step of informing a packet generator of a new channel identifier/multicast address map (P635), and the twelfth step of ending the channel generating procedure.

Referring to FIG. 7, the channel deleting procedure starts if an IGMP LEAVE message is received from a port of a L2 Ethernet switch by an IGMP snooping function or if a control processor recognizes termination of multicast membership through periodic monitoring of IGMP QUERY and IGMP REPORT messages by the IGMP snooping function (the first step P650). The channel deleting procedure is then constructed to include the second step of deleting a requested port from a channel identifier member table (P651), the third step of deleting a requested port from a L2 multicast table (P652), the fourth step of checking whether another member exists in the channel identifier member table (P653), the fifth step of judging the result of the fourth step (P654), the sixth step of terminating the procedure without taking any action if another member exists in the channel identifier member table (P660), the seventh step of returning a corresponding multicast address to a multicast address pool if another member does not exist in the channel identifier member table (P670), the eighth step of commanding a corresponding tuner to return to an idle state (P671), the ninth step of commanding a multicast packet generator to delete a corresponding channel identifier/multicast address map (P672), and the tenth step of returning the corresponding tuner to an idle tuner pool and then terminating the procedure (P673).

As described above, the present invention can simultaneously provide a broadcast service and an IP data service by using a broadcast-communication combination type home gateway, and thereby can provide a broadcast service to a host having a software CODEC function, such as a PC by the software CODEC function and provide a broadcast service to a broadcast host not having a software CODEC function by a simple IP set-top function.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A home broadcast service providing method by using a home gateway providing an optical communication packet data interface function, the method comprising the steps of:
   (a) dividing an optical signal received from an access network into an IP (Internet protocol) network's packet data signal and a broadcast network's broadcast stream signal;
   (b) transmitting the IP network's packet data signal to an ONU (optical network unit) module of the home gateway and packetizing the IP network's packet data signal, and then transmitting the packetized IP network's packet data signal to a Layer 2 Ethernet switch of the home gateway though an IP WAN (wide area network) port of the Layer 2 Ethernet switch;
   (c) transmitting the broadcast network's broadcast stream signal to a broadcast packet to IP multicast packet module of the home gateway, converting the broadcast network's broadcast stream signal into an IP multicast packet, and then transmitting the resulting IP multicast packet to the Layer 2 Ethernet switch;
   (d) processing the IP network's IP multicast packet and the IP multicast packet into which the broadcast stream signal has been converted according to a Layer 2 multicast MAC (medium access channel) table to then transmit the processed packets to a destination port, and transmitting an unicast packet received from the IP network to a control processor of the home gateway though a CPU (central processing unit) port of the Layer 2 Ethernet switch;
   (e) performing required functions of the control processor, including a NAT/PAT (network address translation to port address translation) function with respect to the unicast packet received from the Layer 2 Ethernet switch, and then retransmitting the resulting packet to the Layer 2 Ethernet switch to then transmit the retransmitted packet to a destination port; and
   (f) generating and assigning a new broadcast channel when a new host requests a new broadcast channel, wherein the step of generating and assigning comprises the steps of:
   when the control processor receives an IGMP (Internet group management protocol) JOIN message from a port of the Layer 2 Ethernet switch by an IGMP snooping function, checking at the control processor whether a requested channel identifier obtained from the IGMP JOIN message exists in an active channel identifier table;
   adding a corresponding port to the active channel identifier table and adding the corresponding port to the Layer 2 multicast MAC table of the Layer 2 Ethernet switch, if the requested channel identifier exists in the active channel identifier table;
   selecting a new multicast address from a multicast address pool, if the requested channel identifier does not exist in the active channel identifier table;
   selecting a tuner required to be activated from an idle tuner pool;
   assigning the requested channel identifier to the selected tuner;
   generating a new Layer 2 multicast table in the Layer 2 Ethernet switch;
   informing a newly-activated tuner of a newly-requested channel identifier; and
   informing a packet generator of a new channel identifier/multicast address map.

2. A home broadcast service providing method by using a home gateway providing an optical communication packet data interface function, the method comprising the steps of:
   (a) dividing an optical signal received from an access network into an IP (Internet protocol) network's packet data signal and a broadcast network's broadcast stream signal;
   (b) transmitting the IP network's packet data signal to an ONU (optical network unit) module of the home gateway and packetizing the IP networks packet data signal, and then transmitting the packetized IP network's packet data signal to a Layer 2 Ethernet switch of the home gateway though an IP WAN (wide area network) port of the Layer 2 Ethernet switch;
   (c) transmitting the broadcast network's broadcast stream signal to a broadcast packet to IP multicast packet module of the home gateway, converting the broadcast network's broadcast stream signal into an IP multicast packet, and then transmitting the resulting IP multicast packet to the Layer 2 Ethernet switch;
   (d) processing the IP network's IP multicast packet and the IP multicast packet into which the broadcast stream signal has been converted according to a Layer 2 multicast MAC (medium access channel) table to then transmit the processed packets to a destination port, and transmitting an unicast packet received from the IP network to a control processor of the home gateway though a CPU (central processing unit) port of the Layer 2 Ethernet switch;
   (e) performing required functions of the control processor, including a NAT/PAT (network address translation to port address translation) function with respect to the unicast packet received from the Layer 2 Ethernet switch, and then retransmitting the resulting packet to the Layer 2 Ethernet switch to then transmit the retransmitted packet to a destination port; and
   (f) deleting a currently-serviced broadcast channel, wherein the step of deleting comprises the steps of:

when an IGMP (Internet group management protocol) LEAVE message is received from a port of the Layer 2 Ethernet switch by an IGMP snooping function or when the control processor recognizes termination of a multicast membership recognized though periodic monitoring of IGMP QUERY and IGMP REPORT messages, deleting a requested port from a channel identifier member table;

deleting the requested port from the Layer 2 multicast MAC table;

checking whether another member exists in the channel identifier member table;

judging the result of the checking step;

terminating the step of deleting the currently-serviced broadcast channel without taking any action if another member exists in the channel identifier member table;

returning a corresponding multicast address to a multicast address pool if another member does not exist in the channel identifier member table;

commanding a corresponding tuner to return to an idle state;

commanding a multicast packet generator to delete a corresponding channel identifier to multicast address map; and returning the corresponding tuner to an idle tuner pool and then terminating the step of deleting the currently-serviced broadcast channel.

* * * * *